United States Patent [19]

Spicuzza, Jr.

[11] 4,312,957

[45] Jan. 26, 1982

[54] FAST-COOLING STYRENE POLYMER FOAMS

[75] Inventor: John P. Spicuzza, Jr., Mt. Lebanon, Pa.

[73] Assignee: Atlantic Richfield Company, Los Angeles, Calif.

[21] Appl. No.: 193,338

[22] Filed: Oct. 1, 1980

[51] Int. Cl.$^3$ .............................................. C08V 9/18
[52] U.S. Cl. .................................. 521/60; 521/56; 521/57; 521/59
[58] Field of Search ..................... 521/56, 59, 60, 57

[56] References Cited

U.S. PATENT DOCUMENTS

| | | | |
|---|---|---|---|
| 3,480,570 | 11/1979 | Roberts et al. | 260/2.5 |
| 3,503,908 | 3/1970 | Ingram et al. | 521/59 |
| 3,789,028 | 1/1974 | Heiskel et al. | 260/2.5 B |
| 3,817,879 | 6/1974 | Walter et al. | 260/2.5 B |
| 3,827,990 | 8/1974 | Wright | 521/60 |

*Primary Examiner*—Morton Foelak
*Attorney, Agent, or Firm*—Lewis J. Young

[57] ABSTRACT

Expandable styrene polymer particles which have fast cooling rates during molding are produuced by suspending styrene polymer particles in an aqueous medium and impregnating a blowing agent into the particles in the presence of 0.1 to 0.6 parts of a synergistic mixture of surfactants per 100 parts of polymer particles.

10 Claims, No Drawings

FAST-COOLING STYRENE POLYMER FOAMS

BACKGROUND OF THE INVENTION

This invention relates to a process for making foamed styrene polymers fast cooling during molding by incorporating a synergistic mixture of surfactants into the polymer during the impregnation of the polymers with a blowing agent.

The making of low density, cellular, shaped plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article.

This invention also relates to a process for producing thick-section moldings of foamed styrene polymers.

The formation of molded articles from expandable styrene polymer particles is effected in two steps (1) pre-expanding of foamable styrene polymer particles to a density of between 1 and 3 pounds per cubic foot; and (2) further heating the pre-expanded particles in a closed mold to cause further expansion and form a fused, one piece article having the shape of the mold. The second step is what is normally referred to as "molding".

The pre-expansion step may be carried out by heating the expandable polymer pellets by any suitable heating medium such as steam, hot air, hot water, or radiant heat. An excellent method of pre-expansion of the particles is a process such as that disclosed in U.S. Pat. No. 3,023,175 by Rodman. Another excellent method is that disclosed in U.S. Pat. No. 3,577,360 by Immel, which teaches the pre-expansion of polymer beads by heating in a dry atmosphere followed by the application of a vacuum to cause the particles to expand to the desired density.

The molding step normally comprises 4 cycles: (1) the preheating cycle in which the empty mold is preheated with steam; (2) the fill cycle in which the mold is filled with pre-expanded polymer particles; (3) the fusion cycle in which the mold is closed and heated with steam to further expand the particles therein and cause the particles to fuse together; and (4) the cool cycle in which the mold is cooled, usually with recirculating water, or the application of vacuum, to cool the polymer below the softening point of the polymer, the mold is opened and the molded foamed molding is removed from the mold.

After the granules have been heated in the mold to form the desired article, the article must then be cooled for a relatively long period of time, depending upon the thickness of the article, before it can be removed from the mold in a self-supporting state to retain its shape outside the mold. Foamed plastic has good insulation qualities, so the cooling time for the article consumes a large part of the molding cycle and greatly restricts the number of articles that can be produced from a mold in a given period of time.

The cooling time is not appreciably shortened by applying cooling media to the surface of the article or to the mold surface since the heat transfer through the article is extremely slow. This low heat transfer rate is in fact one of the properties which makes these articles useful, for example, for insulation. If the articles are removed from the mold too soon, the combination of the softness of the thermoplastic material and the pressure due to the hot interior of the article will cause the article to bulge and thereafter not have the desired shape.

In U.S. Pat. No. 3,480,570, the addition of a sorbitan fatty acid ester to the surface of expandable styrene polymer particles gave reduced cool time in molding operations.

U.S. Pat. No. 3,503,908 taught the impregnation with polyoxyethylene monoesters of fatty acids, polyoxyethylene sorbitan monoesters of fatty acids, and polyoxyethylene monoethers of fatty alcohols having HLB number of at least 15 to give fast-cool moldings.

U.S. Pat. No. 3,789,028 taught the surface-coating of expandable styrene polymer particles with mono-, di- and triesters of glycerol with fatty acids to aid in shortening the cool time during foaming.

U.S. Pat. No. 3,817,879 taught the surface coating of expandable styrene polymer particles with certain monocarboxamides to give fast cool moldings.

SUMMARY OF THE INVENTION

In accordance with the present invention, a synergistic mixture of surfactants, comprising (1) a first surfactant selected from the group consisting of polyoxyethylene sorbitan monoesters of fatty acids, polyoxyethylene monoesters of fatty acids and polyoxyethylene monoethers of long-chain fatty alcohols, and (2) a second surfactant selected from the polyoxyethylene monoethers of alkylphenols, is incorporated into styrene polymer particles during the process of impregnating the particles with a blowing agent. Incorporation of from 0.1 to 0.6 parts of surfactant mixture per 100 parts of polymer gives a foamable product which, when molded, requires less time to cool than styrene polymers not having the surfactant present.

DETAILED DESCRIPTION OF THE INVENTION

In accordance with this invention, a variety of expandable thermoplastic homopolymers and copolymers can be rendered fast cooling. The polymers may be derived from vinyl aromatic monomers including styrene, vinyltoluene, isopropylstyrene, alpha-methylstyrene, nuclear methylstyrene, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

Especially useful are polystyrene, and copolymers of styrene with 5–30 weight percent of acrylonitrile, maleic anhydride or methyl acid maleate.

The styrene polymers may be in the form of beads, granules, or other particles convenient for molding operation. Especially useful are the beads formed by the suspension polymerization of the vinyl aryl monomers alone or in combination with the minor amount of copolymerizable monomers.

The styrene polymers can, of course, be produced by any of the known techniques. The preferred method of preparation is the suspension technique, which gives bead or pellet shaped product.

The mixture of surfactants may be added to the polymer particles after the particles have been completely polymerized (i.e., as a hard bead impregnation). Addition of surfactants prior to substantially complete polymerization can result in upsetting the delicate balance needed for the polymerization reaction and would result in interference with the reaction. The addition, in this instance, is to the aqueous suspension in which the particles were prepared and prior to separation of the particles from the aqueous reaction medium. The blowing agent can be added either prior to hard bead formation or simultaneously with the surfactant.

Preferably, particles of styrene polymer may be resuspended in an aqueous medium and impregnated with blowing agent and the mixed surfactants. In this case, suspending agents are added to the water to keep the particles from agglomerating at the elevated temperatures used during the impregnation process. Suitable suspending agent systems are, for example, those described in D'Alelio U.S. Pat. No. 2,983,692, such as tricalcium phosphate in combination with an anionic surfactant. The polymer particles are suspended in water in a ratio between 0.3 to 1 and 1.5 to 1 (polymer to water).

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4-7 carbon atoms in the molecule, such as butane, pentane, hexane, heptane, cyclohexane, and the halogenated hydrocarbons which boil at a temperature below the softening point of the polymer. Mixtures of these agents may also be used, such as a mixture of 40-60% n-pentane and 60-40% trichlorofluoromethane. Usually from 3 to 20% of blowing agent per 100 parts of polymer is incorporated by the impregnation.

The synergistic mixture of surfactants may be added to the suspension of polymer particles at the same time as the blowing agent. Best results are obtained when amounts of total surfactant 0.1 and 0.6 parts per 100 parts of polymer are added. Less than 0.1 part of surfactant does not give sufficiently low cooling times, greater than 0.6 parts of surfactant serve no useful purpose and increase the cost of the products.

The synergistic mixture of surfactants consists of (a) a first surfactant selected from the group consisting of polyoxyethylene sorbitan monoesters of fatty acids, polyoxyethylene monoesters of fatty acids, and polyoxyethylene monoethers of long-chain fatty alcohols and (b) a second surfactant selected from the polyoxyethylene monoethers of alkylphenols.

The polyoxyethylene moiety contains from 10 to 50 moles of ethylene oxide per molecule. The fatty acids or fatty alcohols contain 10 to 18 carbon atoms per molecule. The alkyl portion of the alkylphenols contains from 8 to 12 carbon atoms.

The ratio of surfactant (a) to surfactant (b) used may be between 3 to 1 and 1 to 1 to obtain the desired synergistic mixture.

Suitable first surfactants include polyoxyethylene sorbitan monoesters or fatty acids such as polyoxyethylene(20)sorbitan monolaurate, polyoxyethylene(20)sorbitan monopalmitate, polyoxyethylene(20)monostearate, and polyoxyethylene(20)monooleate; polyoxyethylene monoesters of fatty acids such as polyoxyethylene(20)monolaurate and polyoxyethylene(20)monostearate; and polyoxyethylene monoethers of fatty acids such as polyoxyethylene(23)monolauryl ether, polyoxyethylene(10)monocetyl ether, polyoxyethylene(20)monocetyl ether, polyoxyethylene(10)monostearyl ether, and polyoxyethylene(20)monooleyl ether.

Suitable second surfactants include polyoxyethylene(16)octylphenol ether, polyoxyethylene(20)nonylphenol ether, polyoxyethylene(30)octylphenol ether and polyoxyethylene(30)nonylphenol ether.

The numbers in the brackets represent the number of ethylene oxide moles per molecule in the polyoxyethylene moieties.

The invention is further illustrated by the following examples wherein parts are parts by weight unless otherwise indicated.

EXAMPLE I

To a reactor, there was charged in sequence 100 parts of water, 0.025 part of sodium dodecylbenzenesulfonate, 2.0 parts of tricalcium phosphate, 100 parts of polystyrene beads having a particle size of predominantly through 16 and on 35 mesh, U.S. Standard Sieve, 8.5 parts of n-pentane, and the amounts and type of surfactants shown in Table I. The mixture was stirred and heated during 1 hour to 90° to form a suspension. The suspension was maintained at 90° C. for 3 hours and then the temperature was raised during 0.5 hour to 115° C. and maintained at that temperature for an additional 6 hours. The suspension was cooled to room temperature and acidified to a pH of 1.4 with HCl. The beads were separated from the aqueous phase by centrifuge, washed with water, and air dried to room temperature. A control experiment was run using the above procedure omitting the ether surfactants.

The beads from the above impregnation process were pre-expanded to a density of about 1.4 pounds per cubic foot (pcf). The pre-expanded beads were then molded into discs, 8" in diameter by 2" thick by placing the beads in a test mold consisting of a porous mold cavity surrounded by a steam chest. Steam at 30 psig was introduced into the steam chest to cause the granules to expand and fuse together. After the steam was shut off, cooling water was circulated through the steam chest. (As used, hereinafter, the term "foam cooling time" is defined as the time it is necessary to circulate the cooling water at 30° C. through the steam chest before the disc is self supporting and will not expand when it is removed from the mold cavity.) Discs molded from these granules were self supporting and could be removed from the mold after the foam cooling times shown in the Table I. Billets molded from the control granules had a foam cooling time of about 120 seconds.

TABLE I

| Additive (% Added) | Cool Time, Seconds At Density 1.4 pcf | Cool Time Reduction vs. Control (%) |
|---|---|---|
| None | 120 | — |
| Brij-98 (a) (0.35) | 55 | 54 |
| Triton X-165 (b) (0.35) | 45 | 62.5 |
| Brij-98 (0.25) Triton X-165 (0.10) | 7 | 94.4 |
| Brij-98 (0.20) Triton X-165 (0.10) | 7 | 94.4 |

TABLE I-continued

| Additive (% Added) | Cool Time, Seconds At Density 1.4 pcf | Cool Time Reduction vs. Control (%) |
|---|---|---|
| Brij-98 (0.15) Triton X-165 (0.15) | 7 | 94.4 |

(a) Polyoxyethylene(20)oleyl ether
(b) Polyoxyethylene(16)octylphenol ether

It is obvious from the data in Table I that the combination of Brij-98 and Triton X-165 acts synergistically to reduce the mold cool time of the foamed discs.

EXAMPLE II

The procedure of Example I was followed using the same size polystyrene beads with the surfactant mixtures shown in Table II. Once again, the use of a mixture of surfactants gave a synergistic lowering of foam cool times.

TABLE II

| Additive (% Added) | Cool Time, Seconds At Density 2.0 pcf | Cool Time Reduction vs. Control (%) |
|---|---|---|
| None | 176 | — |
| Brij-98 (0.35) | 92 | 47 |
| Triton X-305 (a) (0.35) | 98 | 46 |
| Brij-98 (0.15) Triton X-305 (0.15) | 77 | 56 |
| None | 220 | — |
| Brij-58 (b) (0.35) | 118 | 46 |
| Triton X-165 (0.35) | 124 | 44 |
| Brij-58 (0.15) Triton X-165 (0.15) | 110 | 50 |

(a) Triton X-305 is polyoxyethylene(30)octylphenol ether
(b) Brij-58 is polyoxyethylene(20)monocetyl ether

I claim:

1. Method of making foamable styrene polymer particles which yield a fast cooling foamed molding comprising the steps of:
   (a) suspending styrene polymer particles in water with the aid of a suspending agent system;
   (b) adding 3 to 20 weight percent of a blowing agent and 0.1 to 0.6 weight percent of a synergistic mixture of (1) a first surfactant selected from the group consisting of polyoxyethylene sorbitan monoesters of fatty acids, polyoxyethylene monoesters of fatty acids, and polyoxyethylene monoethers of long-chain fatty alcohols and (2) a second surfactant selected from the polyoxyethylene monoethers of alkylphenols, wherein the polyoxyethylene moieties contain from 10 to 50 moles of ethylene oxide per molecule, the fatty acids and alcohols contain from 10 to 18 carbon atoms per molecule, and the alkyl portion of the alkylphenols contains from 8 to 12 carbon atoms wherein said synergistic mixture consists of a ratio of said first surfactant to said second surfactant of between 3 to 1 and 1 to 1;
   (c) heating the suspension at a temperature of from 80° to 150° C. to impregnate the polymer particles with blowing agent and the mixed surfactants; and
   (d) separating the impregnated particles from the aqueous system.

2. The method of claim 1 wherein said styrene polymer particles are polystyrene.

3. The method of claim 1 wherein said styrene polymer particles are a copolymer of styrene with minor amounts of maleic anhydride.

4. The method of claim 1 wherein said styrene polymer particles are a copolymer of styrene with minor amounts of acrylonitrile.

5. The method of claim 1 wherein said styrene polymer particles are a copolymer of styrene with minor amounts of methyl acid maleate.

6. A composition comprising a styrene polymer containing dispersed throughout 3 to 20 weight percent of a blowing agent and 0.1 and 0.6 weight percent of a synergistic mixture of (1) a first surfactant selected from the group consisting of polyoxyethylene sorbitan monoesters of fatty acids, polyoxyethylene monoesters of fatty acids, and polyoxyethylene monoethers of long-chain fatty alcohols and (2) a second surfactant selected from the polyoxyethylene monoethers of alkylphenols, wherein the polyoxyethylene moieties contain from 10 to 50 moles of ethylene oxide per molecule, the fatty acids and alcohols contain from 10 to 18 carbon atoms per molecule, and the alkyl portion of the alkylphenols contains from 8 to 12 carbon atoms wherein said synergistic mixture consists of a ratio of said first surfactant to said second surfactant of between 3 to 1 and 1 to 1.

7. The composition of claim 6 wherein the styrene polymer is polystyrene.

8. The composition of claim 6 wherein the styrene polymer is a copolymer of styrene with minor amounts of acrylonitrile.

9. The composition of claim 6 wherein the styrene polymer is a copolymer of styrene with minor amounts of maleic anhydride.

10. The composition of claim 6 wherein the styrene polymer is a copolymer of styrene with minor amounts of methyl acid maleate.

* * * * *